United States Patent Office 3,391,207
Patented July 2, 1968

3,391,207
ALKENYL CYCLOBUTENES
Guido Sartori and Vittorio Turba, Milan, Italy, assignors to Montecatini Edison S.p.A., Milan, Italy, a corporation of Italy
No Drawing. Filed Mar. 15, 1966, Ser. No. 534,424
Claims priority, application Italy, Mar. 16, 1965, 5,759/65
5 Claims. (Cl. 260—666)

The present invention relates to unsaturated hydrocarbon compounds, as well as the process for the preparation thereof.

In summary, this invention relates to unsaturated hydrocarbon compounds of the following formula (I) 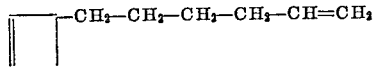

3-(5-hexenyl)-cyclobutene (II) 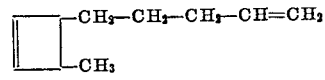

4-methyl-(3-pentenyl)-cyclobutene which are prepared by irradiation of trans-1,3,9-decatriene, or of decatriene-1,4,9 by means of ultraviolet light.

The following general formula is attributable to the unsaturated hydrocarbon compounds according to the present invention.

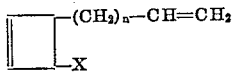

wherein $n$ is 3 or 4. When $n$ is 4, X is H. When $n$ is 3, X is $CH_3$. The new compounds can be identified as 3-(5-hexenyl)-cyclobutene and as 4-methyl-3-(pentenyl)-cyclobutene.

The hexenyl cyclobutene can be obtained, by irradiation of trans-1,3,9-decatriene. The methyl pentenyl cyclobutene can be obtained by irradiation of the reaction product obtained from heating decatriene 1,4,9 to a temperature between 40 and 200° C., in the presence of alkaline metal compounds.

The heating of decatriene-1,4,9 is preferably carried out in the presence of sodium compounds or potassium compounds. Compounds of these metals may be employed of both the inorganic type, such as soda (sodium carbonate, sodium hydroxide) or caustic potash (potassium hydroxide, potassium carbonate), and of the organic type, such as the derivatives of aliphatic or aromatic alcohols. There may be employed, for instance, the derivatives of methyl, ethyl, propyl, isopropyl, n-butyl, tert-butyl alcohols, phenol, or benzyl alcohol. Particularly suitable are: potassium tert-butylate, potassium isopropylate, sodium tert. butylate, sodium isopropylate, caustic soda and caustic potash.

Mono- or polyfunctional alcohols, or ethers are employed as the reaction agent. We may mention, for instance, methanol, ethanol, propanol-1, propanol-2, butanol-1, butanol-2, tert. butanol, normal dipropyl ether, ethylbutylether, diisopropyl ether, diisobutyl ether, diethylenglycoldiethyl ether, diethylenglycol monoether ether, ethylenglycol diethyl ether.

Particularly advantageous results are obtained when employing as the reaction agent dimethylsulphoxide admixed with one or more of the above mentioned substances. The dimethylsulphoxide content of such mixture may vary between 15 and 60% by volume.

In case the alcoholates are used as the promoters of the reaction and an alcohol is desired as the reaction agent, it will obviously be convenient to employ the alcohol which corresponds to the alcoholate.

The reaction may proceed both in the homogeneous phase and in the heterogeneous phase. It occurs in the homogeneous phase when employing, for example, caustic potash or -soda, or a sodium- or potassium alcoholate in the presence of alcohols and, also with dimethylsulphoxide as the reaction agent. But the reaction proceeds in the heterogeneous phase when employing, for instance, caustic potash or -soda in the presence of ethers, such as diethylenglycol diethylether.

In case the reaction takes place in the homogeneous phase, the best results are obtained when employing molar ratios of alkaline metal compound to decatriene 1,4,9 between 1:5 and 1:100, preferably between 1:10 and 1:40. But if the reaction takes place in the heterogeneous phase, said molar ratios should be between 1:6 and 5:1 or, even better, between 1:3 and 3:1.

The reaction is normally carried out in the presence of an inert gas, preferably nitrogen.

The reaction temperature may vary, as already said hereinbefore, between 40 and 200° C.

The duration of the reaction may vary within wide limits. Times between 5 hours and 35 hours are normally preferred. The reaction times are remarkably shortened by the presence of dimethylsulphoxide in the reaction medium. In this case, times between 1 and 4 hours are normally sufficient.

The irradiation of the trans-1,3,9-decatriene or of the product obtained by heating, as above mentioned, the decatriene-1,4,9, is carried out by means of ultraviolet light.

The reaction is carried out in solution. As solvents may be employed: ethers, aliphatic or cycloaliphatic hydrocarbons, such as ethyl ether, isopropyl ether, pentane, heptane, isooctane, cyclohexane, or mixtures thereof. Ethyl ether and pentane are the normally preferred solvents.

The ultraviolet radiation has, normally, a wave length between 2000 and 4000 A. As source of the radiations, mercury-vapour quartz lamps of low, medium, or high pressure type, may be employed.

The reaction is conveniently carried out in glass apparatus of the immersion type which allows high utilization of the emitted radiation. The reaction may also be carried out by irradiating the solution from the outside of the reactor. In this case, however, the utilization of the emitted radiation will be lower.

It is advisable to keep the solution under slight agitation by introducing a nitrogen current through the bottom of the reactor. The current also provides for the removal of any oxygen dissolved in the solution, since it is advisable to carry out the irradiation in the absence of oxygen.

The temperature at which the irradiation is carried out, may vary within wide limits, such as between 10 and 50° C. Normally, however, the operation is carried out at room temperature.

The duration of the irradiation varies within wide limits, depending on the type of lamp used, on the quantity of product to be converted, and on the conversion which is desired.

Times between 50 and 450 hours are normally sufficient.

After the irradiation is accomplished, the solvent is removed by means of distillation at a temperature lower than 85° C. The residue is then subjected to rectification in vacuo.

The product obtained is chromatographically analysed, resulting in the compounds of the present invention.

These compounds can find many useful applications, such as in the preparation, through ozonization, of carbonyl compounds. Also compounds such as aldehydes, amines, and derivatives thereof, can be obtained from these compounds.

The following examples illustrate the present invention without limiting it.

Example 1

2,400 cc. of anhydrous ethyl ether and 24 g. of trans 1,3,9-decatriene are introduced into a 3-neck cylindrical reactor, provided with a water refrigerator, and kept in a nitrogen atmosphere. Into the central neck a low-pressure mercury-vapour quartz lamp (Hanau Model NN 30/89, 30 watt) is introduced. The reactor is immersed in a cylindrical container where water at 15° C. is allowed to circulate. A slight nitrogen current from the bottom of the reactor keeps the solution under agitation. After 183 hours the irradiation is interrupted (conversion 86%).

The resulting solution is subjected to distillation in a column to remove the ether. The resulting residue, when chromatographically analysed, shows the residue to be constituted of 14% of 1,3,9-decatriene and of 84% of a new product (I).

From said residue, the pure product (I), having a boiling point of 57° C./15 mm. Hg and $n_D^{20}=1.4480$, is obtained by rectification in a spiral 91 cm. column.

Analysis of the carbon-hydrogen content and of the infrared spectrum are carried out on the product. The analysis of the carbon-hydrogen content gives the following results:

Theoretical (for $C_{10}H_{16}$): C, 88.16%; H, 11.84%. Found: C, 88.24%; H, 11.78%.

The infrared spectrum of the product exhibits the following characteristic bands:

1640 cm.$^{-1}$—stretching C=C of the vinyl grouping,
992 cm.$^{-1}$—deformation outside the plane of the vinyl C—H group,
910 cm.$^{-1}$—deformation outside the plane of the vinyl CH group,
1560 cm.$^{-1}$—stretching C=C in a cyclobutene ring,
700 cm.$^{-1}$—deformation outside the plane of the hydrogen atoms adjacent to a cis double bond in the ring.

The product is thermally unstable. By heating at 120° C., it gives, in a practically quantitative way, the starting decatriene. This behaviour under heating is characteristic of the compounds having cyclobutene rings.

On the bases of these results, a structure corresponding to 3-(5-hexenyl)-cyclobutene, having the following structure, must be attributed to the product (I).

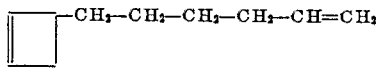

Example 2

100 g. of n-decatriene 1,4,9, 200 cm.$^3$ of anhydrous tert. butanol, and 2.4 g. of potassium tert. butylate, are introduced into a 3-neck 500 cm.$^3$ flask provided with an agitator and a refrigerator, and kept in a nitrogen atmosphere. The whole is heated to 95° C. for 30 hours. The reaction mixture is poured into water. The organic layer is washed with water, dried on anhydrous sodium sulphate and distilled in the column. As a high-boiling fraction, a product is obtained which, under infrared analysis, reveals the presence of conjugated double bonds. The product is 2,4,9-decatriene.

77 g. of this product and 2.5 l. of anhydrous ether are charged into a 3-neck cylindrical reactor. Into the central neck a low-pressure mercury-vapour quartz lamp (Hanau Model NN 30/89, 30 watt) is introduced. The reactor is immersed in a cylindrical container where tap water at room temperature is allowed to circulate. A slight nitrogen current from the bottom of the reactor keeps the solution under agitation. After 400 hours of irradiation, there is no longer any trace of the starting product. The mixture in the reactor is then subjected to distillation in a 90 cm. Todd column filled with small metallic spirals to remove the ether.

When chromatographically analysed, the results show the residue to be constituted of 60% by weight of 4-methyl-3-(4-pentenyl)-cyclobutene. This product is isolated in the pure state by rectification in vacuo of the residue; boiling point 54° C./18 mm. Hg and $$n_D^{20}=1.4488$$

The analysis of the carbon-hydrogen content, of the infrared spectrum, and of the nuclear magnetic resonance spectrum is carried out on the product.

The analysis of the carbon-hydrogen content gives the following results:

Theoretical (for $C_{10}H_{16}$): C, 88.16%; H, 11.84%. Found: C, 88.26%; H, 11.71%.

The infrared spectrum of the product exhibits the following characteristic bands:

3025 cm.$^{-1}$—stretching of the C—H group adjacent to the double bond in the cyclobutene ring.
1560 cm.$^{-1}$—stretching the C=C group in the cyclobutene ring,
3070 cm.$^{-1}$—stretching of the C—H group in the vinyl grouping,
1640 cm.$^{-1}$—stretching of the C=C group in the vinyl grouping,
990 cm.$^{-1}$—deformation outside the plane of the vinyl C—H group,
910 cm.$^{-1}$—deformation outside the plane of the vinyl CH$_2$ group,
1370 cm.$^{-1}$—symmetrical deformation of methyl.

When making use of the values of the absorption coefficients for the methyl and vinyl groups given in the literature, there results a vinyl-to-methyl ratio corresponding to 1:1.

The nuclear magnetic resonance spectrum of the product confirms the presence of a cyclobutene ring, of a vinyl group, and of a methyl group bound to a saturated carbon atom. Also, the cyclobutene ring is found to be bisubstituted with two different substituents.

The product is thermally unstable. By heating to temperatures near 120° C., it gives, in a practically quantitative way, the starting product, that is 2,4,9-decatriene. This behaviour is characteristic of the compounds having the cyclobutene rings.

On the basis of all these results, a structure corresponding to 4-methyl-3-(4-pentenyl)-cyclobutene must be attributed to the product. The structural formula of this product is as follows:

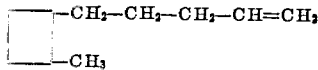

As will be apparent, various changes in details may be made in the practice of this invention with departing from the spirit thereof. It is intended, therefore, to include in the scope of the appended claims, all such modifications in details as will be obvious to those skilled in the art from the description and working examples given herein.

We claim:

1. Unsaturated hydrocarbon compounds having the following general formula:

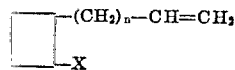

wherein $n$ is 3 or 4; when $n$ is 3, X is CH$_3$ and when $n$ is 4, X is H.

2. 3-(5-hexenyl)-cyclobutene, having the following structure:

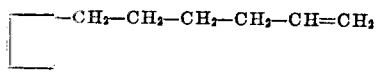

3. A compound according to claim 2 having the boiling point of 57° C. at 15 mm. Hg and $n_D^{20}=1.4480$.

4. 4-methyl-(4-pentenyl)-cyclobutene, having the following structure:

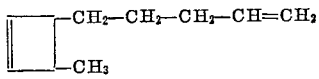

5. A compound according to claim 4 having a boiling point of 54° C. at 18 mm. Hg and $n_D^{20}=1.4480$.

References Cited

UNITED STATES PATENTS 2,995,543   8/1961   Williams _____ 260—666

OTHER REFERENCES

K. J. Crowley, Tetrahedron, vol. 21, pp. 1001–1014, 1965.

George S. Hammond et al., J. Org. Chem., 28, pp. 3297–3303, 1963.

K. J. Crowley, Proceeding Chemical Society, 1962, pp. 334–5.

DELBERT E. GANTZ, *Primary Examiner.*

V. O'KEEFE, *Assistant Examiner.*